Oct. 3, 1950
D. BLITZ
2,524,283
MICROWAVE MEASURING APPARATUS
Filed Dec. 27, 1946
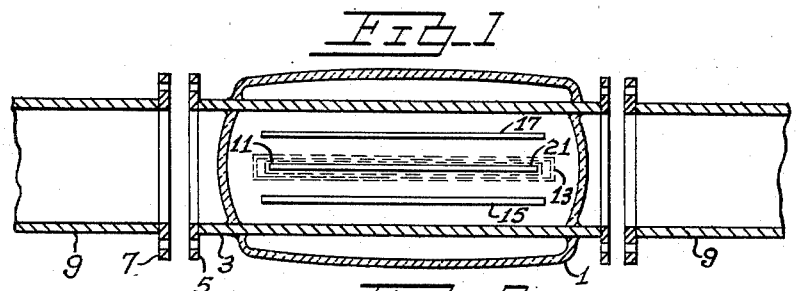
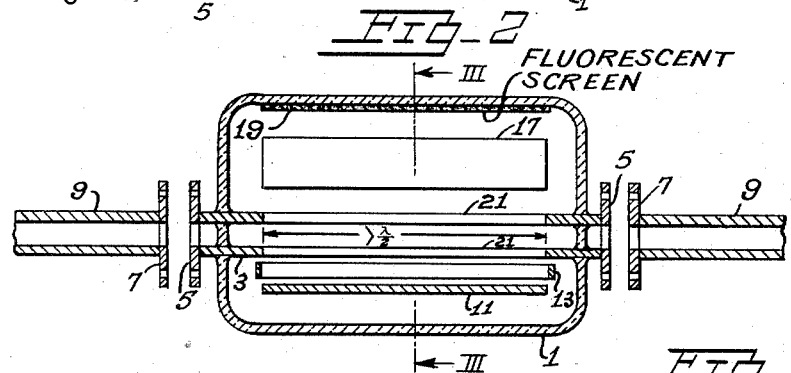
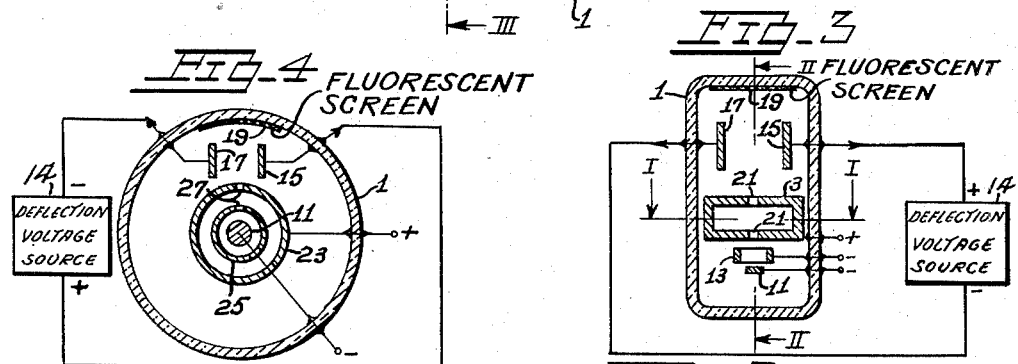
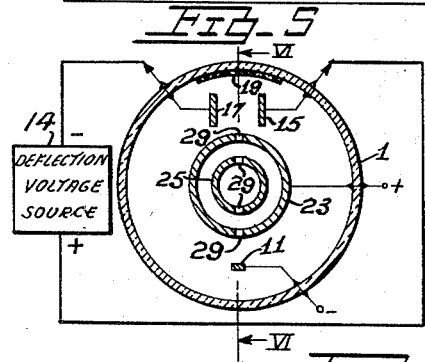
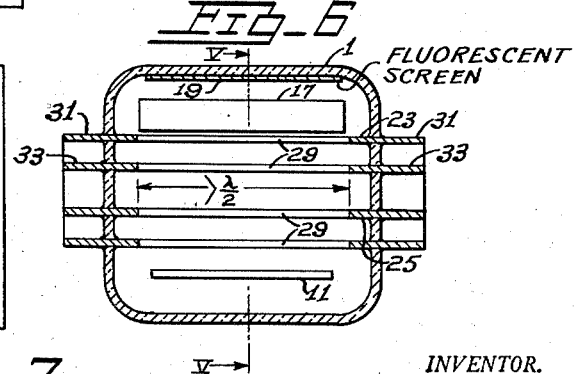
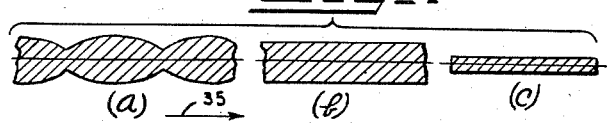
INVENTOR.
*DANIEL BLITZ*
BY
*Attorney*

Patented Oct. 3, 1950

2,524,283

UNITED STATES PATENT OFFICE 2,524,283

MICROWAVE MEASURING APPARATUS

Daniel Blitz, Newtonville, Mass., assignor to Radio Corporation of America, a corporation of Delaware Application December 27, 1946, Serial No. 718,681

12 Claims. (Cl. 315—39)

1

This invention relates generally to microwave measuring systems and more particularly to improved, fully electronic, measuring devices for indicating standing wave characteristics and signal magnitudes in waveguide or coaxial line transmission systems.

Heretofore, various devices such as adjustable wave probes or directional coupler reflectometers have been employed for measuring and indicating the magnitude and distribution of standing waves in waveguide or coaxial line transmission systems. The instant invention contemplates the use of a unique thermionic tube, having a section of waveguide or coaxial line passing therethrough, wherein an electron beam is projected through and parallel to the microwave electric field in the section of waveguide or coaxial line in a manner whereby the beam velocity is modulated by the microwave field in the line, and the velocity modulated electrons are deflected as a function of their velocity by a separate, constant, deflection field to provide an image upon a fluorescent screen enclosed within the tube. Thus, the variations in the microwave field due to standing waves in the waveguide or coaxial line system provide corresponding deflection of the velocity modulated electron beam at the fluorescent screen, resulting in a fluorescent trace corresponding to the standing wave distribution and magnitude.

The waveguide or coaxial line section of the novel indicator tube is serially interposed in the waveguide or coaxial line transmission system in which standing wave measurements are desired. If the waveguide or coaxial line surge impedance is known, and the deflection of the electron trace on the fluorescent screen of the indicator is suitably calibrated, direct indications of transmitted power may be derived.

Among the objects of the invention are to provide an improved method of and means for measuring and indicating microwave propagation through waveguides or coaxial transmission lines. Another object is to provide an improved electronic standing wave indicator. A further object is to provide a standing wave indicator providing a visual and continuous indication of the standing wave distribution and magnitude of microwaves propagated through a waveguide or coaxial line transmission system. An additional

2 object is to provide an improved microwave power measuring device. A further object is to provide an improved microwave standing wave indicator which is operative over a wide frequency range. A still further object of the invention is to provide an improved, completely electronic, microwave measuring device wherein an electron beam is projected through the field of the propagated microwave energy in a waveguide or coaxial line, and the resultant velocity modulated electron beam is deflected by a constant, deflecting field and impinges upon a fluorescent screen to provide visual indications of the magnitude and distribution of the propagated microwaves.

The invention will be described in further detail by reference to the accompanying drawing of which Figure 1 is a cross-sectional, plan view of a first embodiment of the invention, said view being taken along the section line I—I of Figure 3; Figure 2 is a cross-sectional, elevational view of said first embodiment, being taken along the section line II—II of Fig. 3; Figure 3 is an end cross-sectional, elevational view of said first embodiment, being taken along the section line III—III of Fig. 2; Figure 4 is a cross-sectional end view of a second embodiment of the invention for coaxial line measurements; Figure 5 is a cross-sectional end view of a third embodiment of the invention, said cross-section being taken along the section line V—V of Fig. 6; Figure 6 is a cross-sectional, side-elevational view of said third embodiment of the invention, said view being taken along the section line VI—VI of Fig. 5, and Figure 7 is a group of typical cathode ray trace diagrams provided on the fluorescent screen of each of the embodiments of the invention in response to different microwave transmission conditions. Similar reference characters are applied to similar elements throughout the drawing.

Referring to Figures 1, 2 and 3 of the drawing, the novel electronic measuring device comprising the invention includes an evacuated envelope 1 enclosing a short section of waveguide 3 having flanges 5 which abut with similar flanges 7 of a conventional waveguide transmission line 9, operating in the conventional $TE_{10}$ mode where the electric field is parallel to the line II—II in Fig. 3, into which the measuring device is serially connected. The device includes a long thin cathode 11 and a cathode lens 13 on the underside of the waveguide section 3, and a pair of electron beam deflecting plates 15, 17, and a fluorescent screen 19 located above the waveguide section 3. The waveguide section 3 includes a longitudinal slot 21 cut through the center of both wide faces of the waveguide, and extending for a distance of at least one-half wavelength at the minimum operating frequency.

In operation, electrons emitted by the cathode 11 are focused by the electron lens 13 which is maintained at the same, or a slightly negative, potential with respect to the cathode 11, to form a long thin beam of electrons which are accelerated towards the waveguide section 3 which is maintained at a positive potential with respect to the cathode 11, the electron beam then passing through the slots 21 in the waveguide section 3. The radio frequency field in the waveguide section 3, having its alternating electric field parallel to the direction of electron flow, velocity-modulates the electron beam projected therethrough. The velocity modulated electron beam after leaving the waveguide is deflected laterally, and perpendicular to the long dimension of the waveguide slot, as a function of its velocity, by a fixed deflecting field established by applying a fixed unidirectional potential from a source 14 to the deflecting electrodes 15, 17. At each point along the length of the guide the variably deflected electron beam impinges upon the fluorescent screen 19 to provide a broad visible cathode-ray trace, the width of which is proportional to the magnitude of the microwave field at that point in the waveguide section 3.

Since the longitudinal slots 21 are at least one-half wavelength long at the minimum operating frequency, any standing waves occurring in the waveguide section will be visibly indicated by the corresponding variation in width of the cathode ray trace which appears upon the fluorescent screen. Thus the indication provided on the fluorescent screen will represent the distribution and magnitude of standing waves occurring in the waveguide section 3, as indicated in Fig. 7. If the impedance of the waveguide section is known, and the deflection of the electron beam is calibrated, visual indications will be provided of the microwave power propagated through the waveguide, even though the wave reflections or standing waves therein are of small magnitude.

The velocity of the electron beam entering the bottom slot of the waveguide section may be controlled by adjusting, in any conventional manner, a positive accelerating potential applied to the waveguide section with respect to the cathode.

The cathode 11 is maintained at such a potential negative with respect to the guide 3, that the electrons are accelerated to a velocity which will cause them to traverse the distance along the electrical axis through the guide in a time $$\frac{nT}{2}$$

where "T" is the period of the microwave signal, and "n" is any odd integer. The velocity modulation of the beam leaving the guide will be inversely proportional to n, making it desirable to have n as small as possible. However, small values of n require high initial accelerating potentials. For example, if a signal frequency of 10,000 megacycles per second is propagated through a conventional rectangular waveguide one centimeter high, the following cathode-to-guide potentials $v$ are required to cause the beam to traverse the guide in the indicated number of half cycles of signal frequency.

| n | v (volts) |
|---|---|
| 1 | 114,000 |
| 3 | 12,600 |
| 5 | 4,500 |
| 7 | 2,300 |
| 9 | 1,400 |
| 11 | 930 |
| 13 | 670 |
| 15 | 510 |

As there is no need either to prevent or to require the accelerated electrons from overtaking or passing the decelerated electrons, the large transit times obtained by the use of low initial accelerating voltage are of little consequence.

The percentage velocity modulation of the electron beam is reasonably high. If, for example, a peak power of one kilowatt is propagated along a transmission waveguide, having a surge impedance of 300 ohms, to a matched load, the maximum R. M. S. voltage will be 550 v. If the cathode-to-guide potential $v$ is 930 volts, the effective modulating potential in the guide will be $$\frac{550}{11}$$

or 50 volts, thereby increasing or decreasing the velocity of the electrons by as much as 50 electron volts, depending on the instant at which they enter the guide. The electrons leaving the guide, therefore, will have all velocity values corresponding to accelerating potentials between 880 and 980 volts, permitting ample deflection spread of the beam by the deflecting field between the electrodes 15, 17.

The deflection of the velocity modulated beam follows the function $$D = \frac{E_d L l}{2 E_a A}$$

where $E_d$ is the deflecting potential, $l$ is the length of the deflecting plates, L is the distance between the fluorescent screen and the center of the deflecting field, A is the separation between the deflection plates, and $E_a$ is the potential through which the electrons have been accelerated before reaching the deflecting field. If $E_d$ is made 2000 volts, $l$ is 2 cm., L is 4 cm., and A is 1 cm., then $$D = \frac{8000}{E_a}$$

If the foregoing example is chosen where the electrons emerge with an electron velocity of 930 volts when there is no microwave energy in the guide, the beam will have a fixed deflection of 8.6 cm. resulting in a thin trace visible along the length of the fluorescent screen. If microwave energy is introduced in the guide, as described heretofore, then electrons will emerge with all velocities between 880 and 980 volts, producing deflections of the beam of from 8.1 to 9.1 cm., depending on the individual electron velocities, and thereby causing the previously thin line trace to broaden to a thick trace 1 cm. wide which can easily be observed for variations in width along its length as an indication of standing waves in the guide.

It should be understood that the entrance velocity of the electron beam may be adjusted to control the deflection scale factor of the velocity modulated electrons. The scale factor also may be controlled by adjusting, in any known manner, the unidirectional potential applied to the deflecting electrodes 15, 17.

Figure 4 shows a second embodiment of the invention adapted to measurements of standing-wave-ratio and power in a coaxial line transmission system. A short section of a coaxial line comprising an outer conductor 23 and a coaxial hollow inner conductor 25 is sealed within the evacuated envelope 1, and leads are brought through the envelope for the deflecting electrodes 15, 17, and for a long central cathode 11 which is disposed within the hollow inner coaxial conductor 25. The upper sides of the coaxial conductors include coincidental longitudinal slots 27 which permit passage of the electron beam generated by the cathode 11 through the radial electric field between the conductors of the coaxial line, the resultant velocity modulated beam being deflected by the external field existing between the deflecting electrodes 15, 17, and thence impinging upon the fluorescent screen 19.

In operation, the hollow inner coaxial conductor 25 operates as an electron accelerator for the emitted electrons, causing a thin beam to pass through the microwave field existing between the conductors of the coaxial line, and to be projected through the aperture in the outer line conductor and to pass between the deflecting electrodes to the fluorescent screen. A negative accelerating potential for the electron beam is applied to the cathode to accelerate all electrons before they enter the microwave field between the coaxial conductors. It is usually desirable to accelerate the electrons between the cathode and the inner conductor of the coaxial line and maintain the two conductors of the coaxial line at the same D.-C. potential.

Figures 5 and 6 illustrate a third embodiment of the invention wherein the cathode 11 is located at the opposite side of the coaxial line 23, 25 from the fluorescent screen 19. The electron-emitting cathode 11 preferably should include a cathode lens such as shown in Figures 1, 2 and 3, but if desired, such a lens may be omitted. Electrons from the cathode 11 pass through four coincidental apertures 29 in opposite sides of the coaxial line conductors 23, 25, and are velocity modulated each time they pass through the radial microwave electric field existing between the coaxial conductors. The thus velocity modulated electron beam projected through the upper aperture of the outer coaxial conductor 23 is deflected by the fixed deflecting field existing between the deflecting electrodes 15, 17, and impinges upon the fluorescent screen 19. The operation of the device shown in Figures 5 and 6 is substantially identical to that of the device shown in Fig. 4 with the exception that the electron beam is subjected twice to the velocity modulating effect of the microwave field between the coaxial conductors, thereby permitting increased sensitivity to propagated microwaves and greater ease of construction. Because of the decreased distance of electron travel in the radio frequency field, and the lower frequencies at which coaxial lines are usually employed, the D.-C. accelerating potentials required may be much smaller than that required for the waveguide embodiments of the invention.

The ends 31, 33 of the coaxial conductors 23, 25, respectively, which project through the evacuated envelope 1 of the second and third embodiments of the invention are proportioned to telescope with, and provide good electrical contact to, the conductors of a standard coaxial line into which the measuring device is to be serially inserted. It should be understood that various types of adapting units, not shown, may be employed for coaxial line measurements on lines of different size, and that, if desired, the projecting ends 31, 33 of the coaxial line section may be slotted or otherwise formed to provide spring contact with the conductors of the associated coaxial line.

For operation in either waveguide or coaxial transmission line systems, there is an optimum range of electron entrance velocity, as controlled by the accelerating potential applied between the accelerating electrode and the cathode, which will effect optimum deflection of the electron beam at the fluorescent screen 19 for reasonable values of microwave field intensity. All of the embodiments of the invention described herein provide extremely flexible measuring instruments, since both the initial or entrance electron velocity and the electron deflecting potentials may be adjusted at will to provide the desired scale factor for indications of microwave standing-wave-ratio, or power, over a wide range and covering a relatively wide frequency spectrum. Except in the frequency range close to the cut-off value for the particular wave-guide or coaxial line, the measuring device is relatively insensitive to changes in the operating frequency.

Figure 7 illustrates the manner in which the transmitted microwave energy is indicated on the fluorescent screen 19 of each of the embodiments of the invention. Figure 7a indicates a microwave signal having an appreciable standing wave ratio, Figure 7b indicates a microwave signal having no appreciable standing-wave-ratio, and Figure 7c indicates the absence of transmitted microwave signals. The average vertical width of the trace is a measure of the magnitude of the transmitted microwave energy. The arrow 35 indicates the direction of wave propagation in the waveguide or coaxial line.

Thus the invention disclosed comprises a completely electronic measuring device which is serially interposed in a wave-guide or coaxial transmission system, and which extracts very little energy therefrom, for indicating directly the magnitude and distribution of standing waves, or the power propagated through the transmission system.

I claim as my invention:

1. Apparatus for measuring microwave propagation in a closed wave transmission system comprising wave transmission means, means for serially coupling said wave transmission means into said wave transmission system, means for generating an electron beam, means for projecting said electron beam through a portion of said transmission means in a plane parallel to the microwave electric field therein to vary the velocities of said projected electrons as a function of the intensity distribution of said microwave field, means disposed adjacent to the path of said projected electrons subsequently to said wave transmission means for deflecting said projected electrons in a region outside said microwave field as a function of said electron velocities, and means for indicating the deflection magnitudes of said deflected electrons for providing indications of the microwave standing wave energy distribution in said transmission system.

2. Apparatus for measuring microwave propagation in a closed wave transmission system comprising wave transmission means, means for serially coupling said wave transmission means into said wave transmission system, means for generating an electron beam, means for projecting said electron beam through a portion of said transmission means in a plane parallel to the microwave electric field therein to vary the velocities of said projected electrons as a function of the intensity distribution of said microwave field, means disposed adjacent to the path of said projected electrons subsequently to said wave transmission means for deflecting said projected electrons in a region outside said microwave field as a function of said electron velocities, means for further projecting said deflected electrons, and means for indicating the deflection magnitudes of said further projected electrons for providing indications of the microwave standing wave energy distribution in said transmission system.

3. Apparatus for measuring microwave propagation in a closed wave transmission system comprising wave transmission means, means for serially coupling said wave transmission means into said wave transmission system, means for generating an electron beam, means for projecting said electron beam through a portion of said transmission means in a plane parallel to the microwave electric field therein to vary the velocities of said projected electrons as a function of the intensity distribution of said microwave field, a fluorescent screen disposed in the path of said beam, means disposed adjacent the path of said projected electrons and between said wave transmission means and said screen for deflecting said projected electrons in a region outside said microwave field between said transmission means and said screen as a function of said electron velocities for providing oscillographic indications on said screen of the microwave standing wave energy distribution in said transmission system.

4. Apparatus for measuring microwave propagation in a closed wave transmission system comprising wave transmission means, means for serially coupling said wave transmission means into said wave transmission system, means substantially disposed at the center axis of said transmission means for generating an electron beam, means for projecting said electron beam through a portion of said transmission means in a plane parallel to the microwave electric field therein to vary the velocities of said projected electrons as a function of the intensity distribution of said microwave field, means disposed adjacent to the path of said projected electrons subsequently to said wave transmission means for deflecting said projected electrons in a region outside said microwave field as a function of said electron velocities, and means for indicating the deflection magnitudes of said deflected electrons for providing indications of the microwave standing wave energy distribution in said transmission system.

5. A device for measuring microwave propagation in a closed wave transmission system including an evacuated envelope, a closed wave transmission line section sealed into and extending through said envelope and including input and output coupling means for series connection in said transmission system, the portion of said line section within said envelope having a plurality of longitudinal slots therethrough, a fluorescent screen enclosed within said envelope, an electron-emissive cathode enclosed within said envelope on an axis parallel to the axis of said line section and positioned to project a beam of electrons through said slots in said line section to said screen, said projected electrons passing through said line section in a plane parallel to the microwave electric field in said section for varying the velocity of said electron beam as a function of the microwave field intensity, an electron beam deflecting element disposed between said line section and said screen, and a source of potential coupled to said deflecting element for deflecting the points of impingement of said beam on said screen as a function of said beam velocities and of the microwave field intensities along said line section.

6. A device for measuring microwave propagation in a wave guide transmission system including an evacuated envelope, a wave guide transmission line section sealed into and extending through said envelope and including input and output coupling means for series connection in said wave guide transmission system, the portion of said line section within said envelope having a plurality of longitudinal slots therethrough, a fluorescent screen enclosed within said envelope, an electron-emissive cathode enclosed within said envelope on an axis parallel to the axis of said line section and positioned to project a beam of electrons through said slots in said line section to said screen, said projected electrons passing through said line section in a plane parallel to the microwave electric field in said section for varying the velocity of said electron beam as a function of the microwave field intensity, an electron beam deflecting element disposed between said line section and said screen, and a source of potential coupled to said deflecting element for deflecting the points of impingement of said beam on said screen as a function of said beam velocities and of the microwave field intensities along said line section.

7. A device for measuring microwave propagation in a wave guide transmission system including an evacuated envelope, a wave guide transmission line section sealed into and extending through said envelope and including input and output coupling means for series connection in said wave guide transmission system, the portion of said line section within said envelope having a plurality of longitudinal slots therethrough, a fluorescent screen enclosed within said envelope, an electron-emissive cathode enclosed within said envelope on an axis parallel to the axis of said line section and positioned to project a beam of electrons through said slots in said line section to said screen, said projected electrons passing through said line section in a plane parallel to the microwave electric field in said section for varying the velocity of said electron beam as a function of the microwave field intensity, a pair of electron beam deflecting electrodes disposed between said line section and said screen, and a source of potential coupled to said deflecting electrodes for deflecting the points of impingement of said beam on said screen as a function of said beam velocities and of the microwave field intensities along said line section.

8. A device for measuring microwave propagation in a coaxial wave transmission system including an evacuated envelope, a coaxial wave transmission line section sealed into and extending through said envelope and including input and output coupling means for series connection in said transmission system, the portion of said line section within said envelope having a plurality of longitudinal slots through the conductors thereof, a fluorescent screen enclosed within said envelope, an electron-emissive cathode enclosed within said envelope on an axis parallel to the axis of said line section and positioned to project a beam of electrons through said slots in said line section to said screen, said projected electrons passing through said line section in a plane parallel to the microwave electric field in said section for varying the velocity of said electron beam as a function of the microwave field intensity, a pair of electron beam deflecting electrodes disposed between said line section and said screen, and a source of potential coupled to said deflecting electrodes for deflecting the points of impingement of said beam on said screen as a function of said beam velocities and of the microwave field intensities along said line section.

9. A device for measuring microwave propagation in a coaxial wave transmission system including an evacuated envelope, a coaxial wave transmission line section sealed into and extending through said envelope and including input and output coupling means for series connection in said transmission system, the portion of said line section within said envelope having a plurality of longitudinal slots through one side of both conductors thereof, a fluorescent screen enclosed within said envelope facing said slots, an electron-emissive cathode enclosed within the inner one of said conductors on an axis parallel to the axis of said line section and positioned to project a beam of electrons through said slots in said line section to said screen, said projected electrons passing radially through said line section in a plane parallel to the microwave electric field in said section for varying the velocity of said electron beam as a function of the microwave field intensity, an electron beam deflecting element disposed between said line section and said screen, and a source of potential coupled to said deflecting element for deflecting the points of impingement of said beam on said screen as a function of said beam velocities and of the microwave field intensities along said line section.

10. A device for measuring microwave propagation in a coaxial wave transmission system including an evacuated envelope, a coaxial wave transmission line section sealed into and extending through said envelope and including input and output coupling means for series connection in said transmission system, the portion of said line section within said envelope having a plurality of longitudinal slots through one side of both conductors thereof, a fluorescent screen enclosed within said envelope facing said slots, an electron-emissive cathode enclosed within the inner one of said conductors on an axis parallel to the axis of said line section and positioned to project a beam of electrons through said slots in said line section to said screen, said projected electrons passing radially through said line section in a plane parallel to the microwave electric field in said section for varying the velocity of said electron beam as a function of the microwave field intensity, a pair of electron beam deflecting electrodes disposed between said line section and said screen, and a source of potential coupled to said deflecting electrodes for deflecting the points of impingement of said beam on said screen as a function of said beam velocities and of the microwave field intensities along said line section.

11. A device for measuring microwave propagation in a coaxial wave transmission system including an evacuated envelope, a coaxial wave transmission line section sealed into and extending through said envelope and including input and output coupling means for series connection in said transmission system, the portion of said line section within said envelope having a plurality of longitudinal slots through the conductors thereof, a fluorescent screen enclosed within said envelope, an electron-emissive cathode enclosed within said envelope on an axis parallel to the axis of said line section diametrically opposite from said screen and positioned to project a beam of electrons through said slots in said line section to said screen, said projected electrons passing diametrically through the slots in both conductors of said line section in a plane parallel to the microwave electric field in said section for varying the velocity of said electron beam as a function of the microwave field intensity, an electron beam deflecting element disposed between said line section and said screen, and a source of potential coupled to said deflecting element for deflecting the points of impingement of said beam on said screen as a function of said beam velocities and of the microwave field intensities along said line section.

12. A device for measuring microwave propagation in a coaxial wave transmission system including an evacuated envelope, a coaxial wave transmission line section sealed into and extending through said envelope and including input and output coupling means for series connection in said transmission system, the portion of said line section within said envelope having a plurality of longitudinal slots through the conductors thereof, a fluorescent screen enclosed within said envelope, an electron-emissive cathode enclosed within said envelope on an axis parallel to the axis of said line section diametrically opposite from said screen and positioned to project a beam of electrons through said slots in said line section to said screen, said projected electrons passing diametrically through the slots in both conductors of said line section in a plane parallel to the microwave electric field in said section for varying the velocity of said electron beam as a function of the microwave field intensity, a pair of electron beam deflecting electrodes disposed between said line section and said screen, and a source of potential coupled to said deflecting electrodes for deflecting the points of impingement of said beam on said screen as a function of said beam velocities and of the microwave field intensities along said line section.

DANIEL BLITZ.

REFERENCES CITED

The following references are of record in the file of this patent:

UNITED STATES PATENTS

| Number | Name | Date |
| --- | --- | --- |
| 2,242,249 | Varian et al. | May 20, 1941 |
| 2,272,165 | Varian et al. | Feb. 3, 1942 |
| 2,320,860 | Fremlin | June 1, 1943 |
| 2,407,706 | Shulman et al. | Sept. 17, 1946 |
| 2,450,618 | Smullin et al. | Oct. 5, 1948 |